(12) United States Patent
Liu et al.

(10) Patent No.: US 12,375,491 B2
(45) Date of Patent: Jul. 29, 2025

(54) METHOD AND SYSTEM FOR PARENTAL CONTROL OF BROADBAND DEVICES

(71) Applicant: ARRIS Enterprises LLC, Suwanee, GA (US)

(72) Inventors: Xin Liu, Guangdong (CN); Xinkuan Zhou, Guangdong (CN); ZiJie Chen, Guangdong (CN); Yanpeng Guo, Guangdong (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 422 days.

(21) Appl. No.: 17/395,600

(22) Filed: Aug. 6, 2021

(65) Prior Publication Data

US 2022/0131866 A1    Apr. 28, 2022

Related U.S. Application Data

(63) Continuation of application No. PCT/CN2020/122689, filed on Oct. 22, 2020.

(51) Int. Cl.
*H04L 29/06* (2006.01)
*H04L 9/40* (2022.01)

(52) U.S. Cl.
CPC ........ *H04L 63/102* (2013.01); *H04L 63/0227* (2013.01); *H04L 63/083* (2013.01); *H04L 63/101* (2013.01)

(58) Field of Classification Search
None
See application file for complete search history.

(56) References Cited

U.S. PATENT DOCUMENTS

| 2002/0042824 A1* | 4/2002 | Vinati | H04L 63/102 709/225 |
| 2002/0042830 A1* | 4/2002 | Bose | H04L 9/40 709/204 |

(Continued)

FOREIGN PATENT DOCUMENTS

| CN | 101415010 A | 4/2009 |
| CN | 107846413 A | 3/2018 |
| CN | 111756707 A | 10/2020 |

OTHER PUBLICATIONS

International Search Report (PCT/ISA/210) and Written Opinion (PCT/ISA/237) mailed on Apr. 30, 2021, by the Chinese Patent Office as the International Searching Authority for International Application No. PCT/CN2020/122689.

*Primary Examiner* — William J. Goodchild
(74) *Attorney, Agent, or Firm* — Panitch Schwarze Belisario & Nadel LLP

(57) ABSTRACT

A method, a system and a non-transitory computer readable medium are disclosed for preventing access to certain content and/or websites by providing preset keywords, a specific WiFi network (e.g., SSID) for certain users, and/or a preset ports that can be enabled and/or disabled, for example, by a toggle. The method includes populating a plurality of preset keyword filters, each of the plurality of preset keyword filters configured to block access to web content and third-party applications; configuring each of the plurality of preset keyword filters to be enabled or disabled by a toggle on a graphical user interface in communication with the gateway; and providing a custom keyword filter configured to receive custom keywords, the custom keyword filter configured to block access to web content and third-party applications for each of the custom keywords input via the graphical user interface in communication with the gateway.

18 Claims, 12 Drawing Sheets

(56) References Cited

U.S. PATENT DOCUMENTS

| | | | |
|---|---|---|---|
| 2003/0037141 A1* | 2/2003 | Milo | H04L 69/161 |
| | | | 726/13 |
| 2005/0131868 A1* | 6/2005 | Lin | G06F 16/9536 |
| 2005/0195157 A1* | 9/2005 | Kramer | G06T 11/60 |
| | | | 345/156 |
| 2005/0201406 A1* | 9/2005 | Sekine | H04L 47/43 |
| | | | 370/432 |
| 2006/0022048 A1* | 2/2006 | Johnson | G06Q 10/025 |
| | | | 707/E17.117 |
| 2006/0106866 A1* | 5/2006 | Green | H04L 63/123 |
| | | | 709/224 |
| 2008/0104712 A1* | 5/2008 | Oliver | H04L 63/0428 |
| | | | 726/27 |
| 2008/0143538 A1* | 6/2008 | Young | G08B 21/0476 |
| | | | 340/573.1 |
| 2008/0195707 A1* | 8/2008 | May | G06Q 10/107 |
| | | | 709/206 |
| 2009/0077617 A1* | 3/2009 | Levow | H04L 51/212 |
| | | | 726/1 |
| 2009/0300016 A1* | 12/2009 | Kile, Jr. | G06F 3/0482 |
| 2009/0327908 A1* | 12/2009 | Hayton | G06F 21/6218 |
| | | | 715/744 |
| 2010/0241507 A1* | 9/2010 | Quinn | G06Q 30/0256 |
| | | | 705/14.42 |
| 2014/0185597 A1* | 7/2014 | Gupta | H04L 63/108 |
| | | | 370/338 |
| 2018/0212989 A1* | 7/2018 | Mavani | H04L 63/1416 |
| 2018/0329720 A1* | 11/2018 | Tomita | G06F 9/4418 |

* cited by examiner

400

Basic Set | WAN Setup | LAN Setup | Wireless Setup | Firewall | Utilities

Parental Controls

410 → Enable Parental Controls ☑ ← 412

420 → Untrusted SSID [ ] ← 422
Separate by comma if more than one SSID

424 → • Apply for Preset Keyword Rule? ☑ ← 425
426 → • Apply for Preset Port Rule? ☑ ← 427

430 → Untrusted Mac [ ] ← 432
Separate by comma if more than one mac

434 → • Apply for Preset Keyword Rule? ☑ ← 435
436 → • Apply for Preset Port Rule? ☑ ← 437

440 → Internet Pause

FIG. 4A

METHOD AND SYSTEM FOR PARENTAL CONTROL OF BROADBAND DEVICES

TECHNICAL FIELD

The present disclosure generally relates generally to a method and system for parental control of broadband devices, for example, routers and gateways, and more particularly to parental control of customer-premise equipment or customer-provided equipment (CPE).

BACKGROUND

Cable service providers, which are also referred to as Multiple System Operators ("MSO"), or any communication or content distribution business that operates through a cable network, renders its services to its subscribers. The services can include, but are not limited to, different subscription plans for broadband Internet access and telephony. In order to consume these services, subscribers connect to a private network owned (or co-owned or rented) by the broadband cable operator which is implemented according to the Data Over Cable Service Interface Specification (DOCSIS) standard. Subscribers connect their computers, routers, voice-over-IP telephones and other devices to this network through the network terminals, for example, cable modems (CM) or network gateways.

In certain environments, the administrator (e.g., a primary user of the CPE broadband device, for example, a parent or guardian of a child) may wish to block a user, for example, the child of the primary user from accessing certain content on the Internet and/or certain websites, which is being access via, for example, DOCSIS, digital subscriber line (DSL), fiber-optic communications, fix wireless, and the like.

SUMMARY

In accordance with exemplary embodiments, it would be desirable to have systems and methods that enhance the ability of an administrator to block or prevent access to certain content and/or websites on Internet via a broadband device, for example, a gateway by providing preset keywords, a specific WiFi network (e.g., SSID) for certain users, for example, kids, and/or a preset ports that can be enabled and/or disabled, for example, by a toggle.

In accordance with an aspect, a method is disclosed for controlling access to web content and third-party applications, the method comprising: populating, on a gateway, a plurality of preset keyword filters, each of the plurality of preset keyword filters configured to block access to web content and third-party applications; configuring, on the gateway, each of the plurality of preset keyword filters to be enabled or disabled by a toggle on a graphical user interface in communication with the gateway; and providing, on the gateway, a custom keyword filter configured to receive custom keywords, the custom keyword filter configured to block access to web content and third-party applications for each of the custom keywords input via the graphical user interface in communication with the gateway.

In accordance with an another aspect, a method is disclosed for controlling access to web content and third-party applications, the method comprising: populating, on a gateway, a plurality of preset port filters, each of the plurality of preset port filters configured to block access to web content and third-party applications; and configuring, on the gateway, each of the plurality of preset port filters to be enabled or disabled by a toggle via a graphical user interface in communication with the gateway.

In accordance with a further aspect, a method is for controlling access to web content and third-party applications, the method comprising: populating, on a gateway, a plurality of preset port filters, each of the plurality of preset port filters configured to block access to web content and third-party applications; and configuring, on the gateway, each of the plurality of preset port filters to be enabled or disabled by a toggle via a graphical user interface in communication with the gateway.

BRIEF DESCRIPTION OF THE DRAWINGS

FIG. 4A is another illustration of a graphical user interface (GUI) on a device illustrating a system setup page in accordance with a method for setting parental controls on a broadband device.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Parental Control of Broadband Devices

Figure 1:
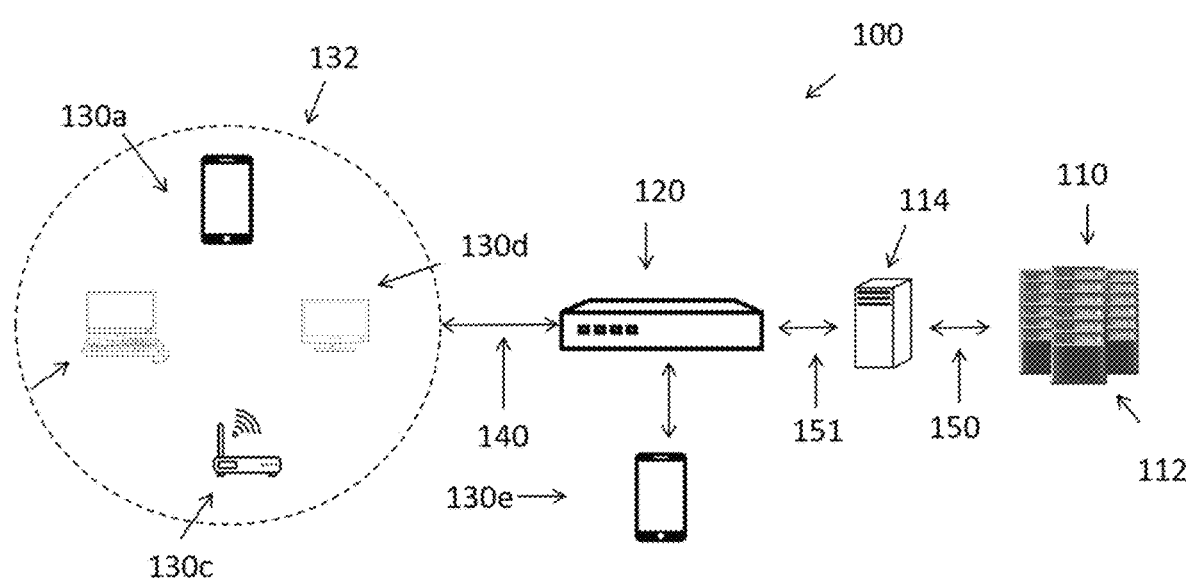
FIG. 1 is an illustration of an exemplary network environment for a system and method for parental control of broadband devices, for example, for a customer-premise equipment or customer-provided equipment (CPE) broadband devices.

FIG. 1 is a block diagram illustrating an example network environment 100 operable for parental control of broadband devices, for example, for customer-premise equipment or customer-provided equipment (CPE) 120. In accordance with an exemplary embodiment, the customer-premise equipment or customer-provided equipment (CPE) 120 can be, for example, a standalone router, or a network gateway in the form of a modem/router/MTA (Multimedia Terminal Adapter) device configured to provide voice, data, and/or video services. In embodiments, the CPE 120 can provide, for example, video and/or data services to a plurality of devices or clients 130a, 130b, 130c, 130d, 130e, 130f. The CPE 120 may communicate with the plurality of devices 130a, 130b, 130c, 130d, 130e over a local network 132 (for example, a local area network (LAN), a wireless local area network (WLAN), a personal area network (PAN), etc.) and/or wired, connected to a modem, and may communicate with an upstream wide area network (WAN) through a connection 150, 151, to one or more servers 110, for example, of a cable service provider 112. For example, the connection 150 can be a coaxial cable, however, the connection 150, 151, can be other mediums including twist pair (DSL), 4G/5G wireless, fiber (PON), etc. The one or more servers 110 can provide high-bandwidth data transfer, for example, cable television and broadband Internet access via, for example, connection 140. In accordance with an exemplary embodiment, the connection 140 may be an Ethernet cable, WiFi, or a coaxial cable, for example, Multimedia over Coax Alliance (MoCA). The one or more servers 110 of the cable service provider 112 can be configured to deliver services, for example, cable television and/or broadband Internet and infrastructure supporting such services including management of image software and/or firmware.

In accordance with an exemplary embodiment, central office equipment 114, for example, a cable modem termination system (CMTS), a Digital Subscriber Line Access Multiplexer (DSLAM) (digital subscriber line (DSL)), an optical line terminal (OLT) (passive optical network (PON)), or a based station (fix wireless) can be located between the one or more servers 110 of the cable server provider 112 and the CPE 120.

In accordance with an exemplary embodiment, the CPE 120 and the plurality of devices 130a, 130b, 130c, 130d, 130e, 130f can be configured to connect via a wireless network, for example, wireless network utilizing an IEEE 802.11 specification, including a set-top box (STB), a smart phone, a smart TV, a computer, a mobile device, a tablet, a router, a home security system, or any other device operable to communicate wirelessly with the CPE 120. The CPE 120 may provide access to an external network, such as the Internet, for any devices connected thereto via the area network 132. The area network 132 may be, for instance a local area. In accordance with an exemplary embodiment, the CPE broadband device 120 may be a gateway device, an access point, a modem, a wireless router including an embedded modem, a wireless network extender or any other device operable to deliver, for example, data and/or video services from the one or more servers 110 of the cable service provider 112 and/or a wide area network (WAN) to one or more of the plurality of devices 130a, 130b, 130c, 130d, 130e, 130f.

In accordance with an exemplary embodiment, the CPE 120 may communicate with the one or more servers 110 over a wired or a wireless connection. A wireless connection between the one or more servers 110 of the cable service provider 112 and the CPE broadband device 120 may be established through a protected setup sequence (for example, Wi-Fi protected setup (WPS)). The protected setup sequence may include the steps of scanning multiple wireless channels for an available access point, exchanging one or more messages between a station and access point, exchanging key messages (for example, pre-shared key (PSK)) between the station and access point, and installing a key (for example, PSK) at the station.

Computer System Architecture

Figure 2:
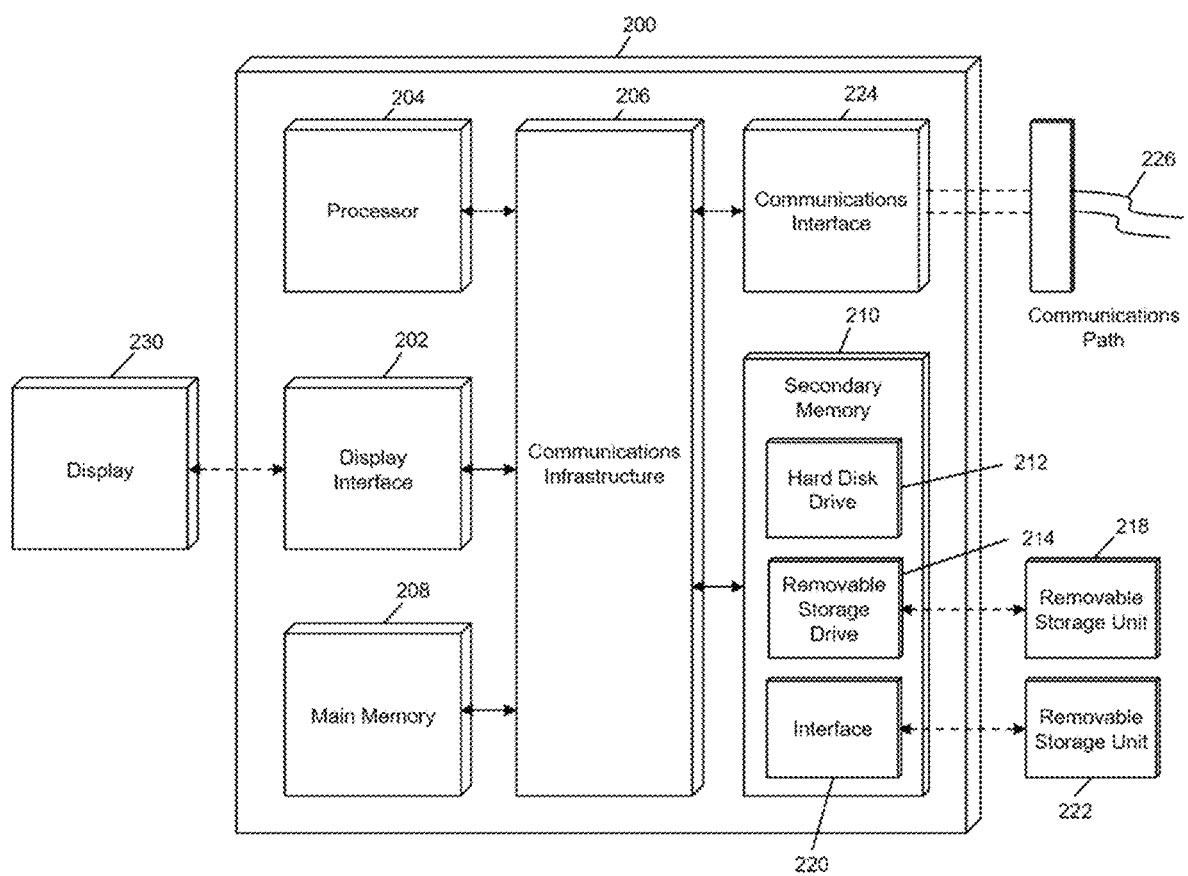
FIG. 2 is an exemplary hardware architecture for an embodiment of a communication device.

FIG. 2 illustrates a representative computer system 200 in which embodiments of the present disclosure, or portions thereof, may be implemented as computer-readable code executed on a processor of a computer. For example, the one or more servers 110, the central office equipment 114, the CPE 120, and the plurality of devices 130a, 130b, 130c, 130d, 130e, of FIG. 1 may be implemented in whole or in part by a computer system 200 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the present disclosure.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 218, a removable storage unit 222, and a hard disk installed in hard disk drive 212.

Various embodiments of the present disclosure are described in terms of this representative computer system 200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 204 may be a special purpose or a general purpose processor device specifically configured to perform the functions discussed herein. The processor device 204 may be connected to a communications infrastructure 206, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 200 may also include a main memory 208 (e.g., random access memory, read-only memory, etc.), and may also include a secondary memory 210. The secondary memory 210 may include the hard disk drive 212 and a removable storage drive 214, such as a floppy disk drive, a magnetic tape drive, an optical disk drive, a flash memory, etc.

The removable storage drive 214 may read from and/or write to the removable storage unit 218 in a well-known manner. The removable storage unit 218 may include a removable storage media that may be read by and written to by the removable storage drive 214. For example, if the removable storage drive 214 is a floppy disk drive or universal serial bus port, the removable storage unit 218 may be a floppy disk or portable flash drive, respectively. In one embodiment, the removable storage unit 218 may be non-transitory computer readable recording media.

In some embodiments, the secondary memory 210 may include alternative means for allowing computer programs or other instructions to be loaded into the computer system 200, for example, the removable storage unit 222 and an interface 220. Examples of such means may include a program cartridge and cartridge interface (e.g., as found in video game systems), a removable memory chip (e.g., EEPROM, PROM, etc.) and associated socket, and other removable storage units 222 and interfaces 220 as will be apparent to persons having skill in the relevant art.

Data stored in the computer system 200 (e.g., in the main memory 208 and/or the secondary memory 210) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 200 may also include a communications interface 224. The communications interface 224 may be configured to allow software and data to be transferred between the computer system 200 and external devices. Exemplary communications interfaces 224 may include a modem, a network interface (e.g., an Ethernet card), a communications port, a PCMCIA slot and card, etc. Software and data transferred via the communications interface 224 may be in the form of signals, which may be electronic, electromagnetic, optical, or other signals as will be apparent to persons having skill in the relevant art. The signals may travel via a communications path 226, which may be configured to carry the signals and may be implemented using wire, cable, fiber optics, a phone line, a cellular phone link, a radio frequency link, etc.

The computer system 200 may further include a display interface 202. The display interface 202 may be configured to allow data to be transferred between the computer system 200 and external display 230. Exemplary display interfaces 202 may include high-definition multimedia interface (HDMI), digital visual interface (DVI), video graphics array (VGA), etc. The display 230 may be any suitable type of display for displaying data transmitted via the display interface 202 of the computer system 200, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 208 and secondary memory 210, which may be memory semiconductors (e.g., DRAMs, etc.). These computer program products may be means for providing software to the computer system 200. Computer programs (e.g., computer control logic) may be stored in the main memory 208 and/or the secondary memory 210. Computer programs may also be received via the communications interface 224. Such computer programs, when executed, may enable computer system 200 to implement the present methods as discussed herein. In particular, the computer programs, when executed, may enable processor device 204 to implement the methods illustrated by FIGS. 1 and 3-11, as discussed herein. Accordingly, such computer programs may represent controllers of the computer system 200. Where the present disclosure is implemented using software executed on hardware, the software may be stored in a computer program product and loaded into the computer system 200 using the removable storage drive 214, interface 220, and hard disk drive 212, or communications interface 224.

The processor device 204 may comprise one or more modules or engines configured to perform the functions of the computer system 200. Each of the modules or engines may be implemented using hardware and, in some instances, may also utilize software executed on hardware, such as corresponding to program code and/or programs stored in the main memory 208 or secondary memory 210. In such instances, program code may be compiled by the processor device 204 (e.g., by a compiling module or engine) prior to execution by the hardware of the computer system 200. For example, the program code may be source code written in a programming language that is translated into a lower level language, such as assembly language or machine code, for execution by the processor device 204 and/or any additional hardware components of the computer system 200. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 200 to perform the functions disclosed herein. It will be apparent to persons having skill in the relevant art that such processes result in the computer system 200 being a specially configured computer system 200 uniquely programmed to perform the functions discussed above.

Method for Parental Control Based on Preset Keywords

In accordance with an exemplary embodiment, a method and system is disclosed for parental control of customer-premise equipment or customer-provided equipment (CPE) 120 using a managed site that includes preset keywords, which allows an administrator, for example, a primary user of the customer-premise equipment or customer-provided equipment (CPE) 120, parent and/or guardian, to enable toggles associated with preset keywords on a graphical user interface (GUI) including WebGUIs, mobile applications (mobile APP), or cloud-based applications, or a display screen, for example, on a computer device 130b or smart phone 130a, 130e.

In accordance with an embodiment, the parental control features in accordance with Technical Report 181 for broadband devices, for example, for a CPE, provide the ability of an administrator (e.g., a parent and/or a guardian) to restrict client devices (for example, computers, gaming consoles, tablets, smartphones) 130a, 130b, 130c, 130d, 130e from accessing specific Internet web sites based on uniform resource locator (URL) or keywords. In accordance with an exemplary embodiment, the parental controls can be implemented using a firewall or network security system that monitors and controls incoming and outgoing network traffic based on predetermined security rules, for example, keywords. In addition, for example, the access to the one or more websites can be blocked, for example, for certain times of the day, certain days of the week, or at all times. Generally, by default on customer-premise equipment or customer-provided equipment (CPE) 120, the parental controls is disabled, which allows access to Internet web sites to all of the devices at all times. In addition, a client device's MAC address can be configured such that the device is not affected by the parental control settings.

Under current parental controls, the graphical user interface (GUI) page of the managed sites includes a blocked keyword setting that is not relatively easy-to-use for administrator or parents, for example, since only one keyword can be set at a time, and as such with the one blocked keyword rule or setting, this can lead to a plurality of entries that have to be created to satisfy a parent's control target. In addition, the administrator or parent needs to think or identify themselves those "keywords" that need to be blocked, which results in the functionality of the keyword blocking user interface being rather inconvenient to use. In addition, each keyword entry may also require that the administrator or parent include a blocked time duration. Accordingly, it would be desirable to have a managed site and keyword setting as disclosed in which the feature can be applied, for example, by only a single setting with preset keywords and associated toggles to enable or disable each of the preset keywords.

Figure 3:
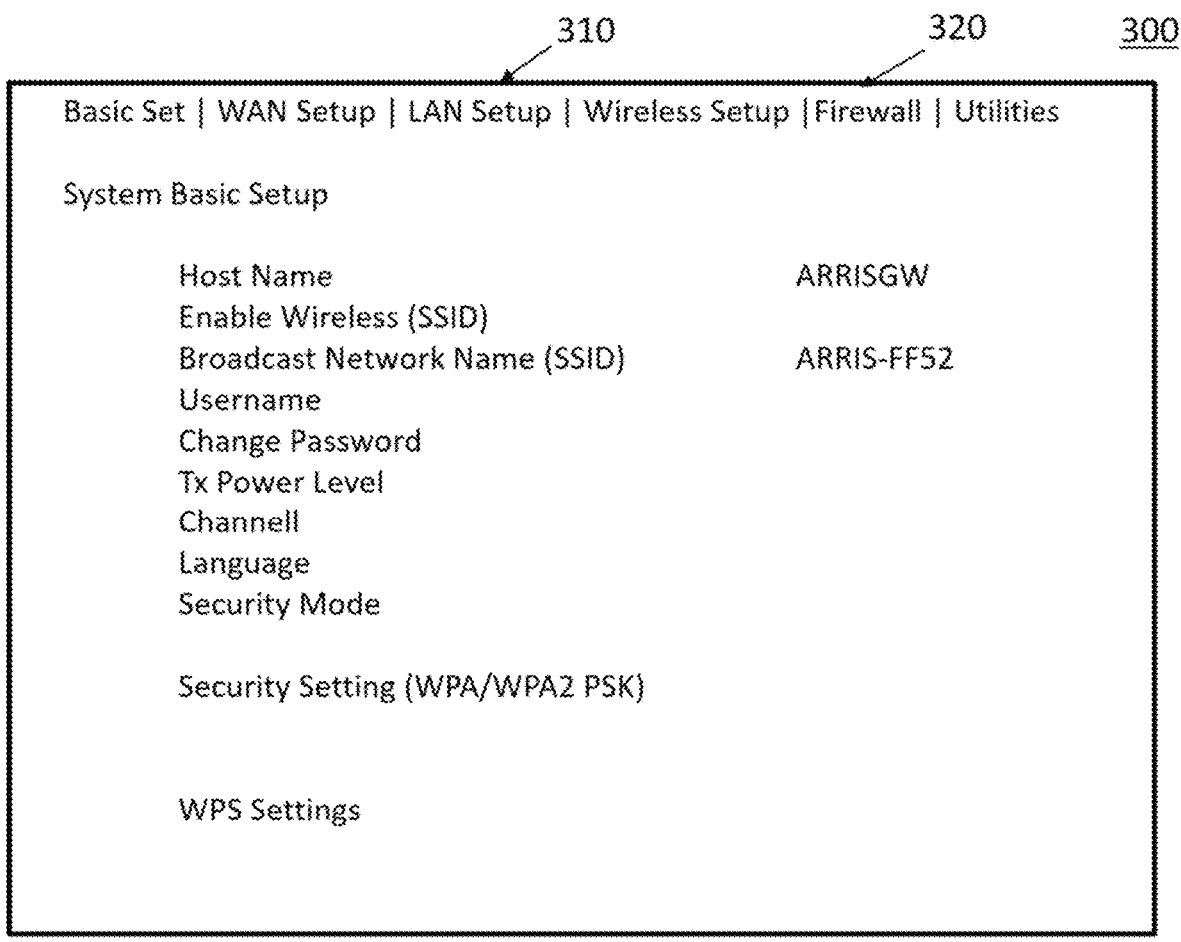
FIG. 3 is an illustration of a graphical user interface (GUI) on a device illustrating a system setup page in accordance with a method for setting parental controls on a broadband device.

For example, under one of the current procedures, a web browser, such as Internet Explorer, Firefox, or Safari is launched, for example, from a computer device 130b or smartphone 130a, 130e. Once the web browser has been launched, a web address or URL (Uniform Resource Locator), for example, http://192.168.0.1 can be typed into the address box, and a login page can be presented to the administrator. Once the login page has been presented, the administrator can enter a user name, for example, "admin" or a customized username in the Username field, and a password, for example, "password" or a customized password in the Password field to present the administrator with a System Setup page 300 as shown in FIG. 3.

On the System Setup Page, the LAN Setup 310 link, for example, on the top menu can be clicked and the local area network (LAN) Settings page will appear. On the LAN Settings page (not shown), the "Client List" link, for example, on the left-hand menu is clicked, which can result in the Client List page appearing. On the "Client List" page, the client's MAC Address under Attached Client List section to be not affected by Parental Control settings can be copied. In accordance with an embodiment, the "Firewall link" 320, for example, on the top menu can be clicked, and the "Firewall Settings", for example, the Parental Controls page 400 will appear as shown in FIG. 4A.

For example, as shown in FIG. 4A, the Parental Controls page 400, can include an "Enable Parental Controls" setting 410 that can be enabled via a check box 412. Alternatively, the Parental Controls, for example, can be disabled by unchecking the "Enable Parental Controls" box 412. If accordance with an exemplary embodiment, the Parental Control page 400 can include "Untrusted SSID" (i.e., untrusted service set identifier or network name) 420 and "Untrusted Mac" (i.e., untrusted Mac addresses) 430, which input can be added in corresponding boxes 422, 432. For example, for each of the Untrusted SSID 420 or Untrusted Mac 430 can be input and separated, for example, by a comma if more than one SSID or on Mac. In addition, the Parental Controls page 400 can include an "Apply Untrusted SSID for Preset Keyword Rule?" 424, 434 and "Apply Untrusted SSID for Preset Port Rule?" 426, 436 for each of the Untrusted SSID 420 and the Untrusted Mac 430 that can be enabled with corresponding check boxes 425, 427, 435, 437. In accordance with an exemplary embodiment, the Parental Controls page 400 will refresh after one or more of the check boxes or input boxes 412, 422, 425, 427, 432, 435, 437 are enabled and/or populated. In accordance with an exemplary embodiment, the Parental Controls Page 400 can also include an "Internet Pause" hyperlink 440, which can be tapped or clicked.

Figure 4B:
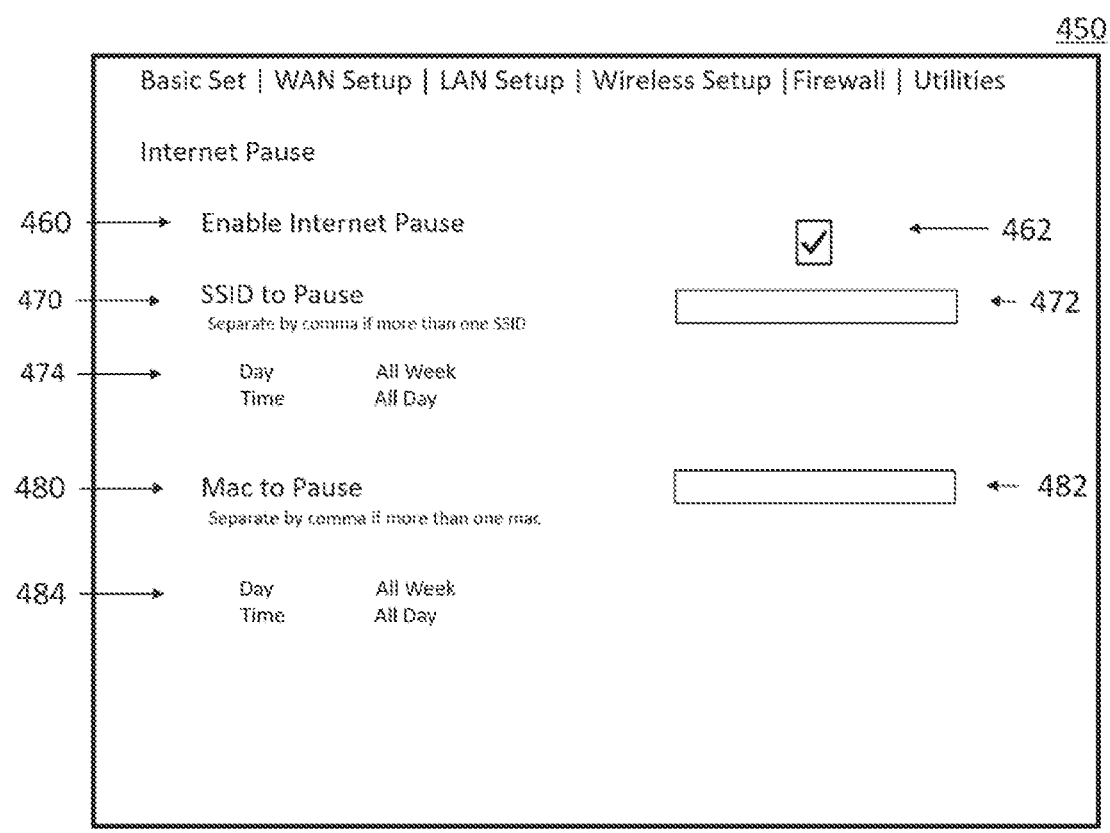
FIG. 4B is a further illustration of a graphical user interface (GUI) on a device illustrating a system setup page with Internet pause in accordance with a method for setting parental controls on a broadband device.

FIG. 4B is a further illustration of a graphical user interface (GUI) on a device illustrating a system setup page with Parental Controls page with Internet pause 450 in accordance with a method for setting parental controls on a broadband device. For example, as shown in FIG. 4B, the Parental Controls page with Internet pause 450, can include an "Enable Internet Pause" setting 460 that can be enabled via a check box 462. Alternatively, the Parental Controls, for example, can be disabled by unchecking the "Enable Internet Pauses" box 462. If accordance with an exemplary embodiment, the Parental Control page 450 can include "SSID to Pause" (i.e., untrusted service set identifier or network name) 470 and "Mac to Pause" (i.e., untrusted Mac addresses) 480, which input can be added in corresponding boxes 472, 482. For example, for each of the SSID to Pause 470 or Mac to Pause 480 can be input and separated, for example, by a comma if more than one SSID or on Mac. In addition, the Parental Controls page 450 can include a "Day" and "Time" setting 474, 484, for each of the SSID to Pause 470 and Mac to Pause 480. In accordance with an exemplary embodiment, the Parental Controls page 450 will refresh after one or more of the check boxes and/or input boxes 462, 472, 482 are enabled and/or populated.

In accordance with an exemplary embodiment, it would be desirable to provide the administrator with a plurality of preset keywords, rather than requiring the administrator, for example, a parent or guardian, to be fully aware of keywords for preventing, for example, teenagers and/or younger children from accessing inappropriate websites and/or searching for questionable and concerning content. In addition, the preset keywords and/or corresponding websites can be updated automatically, for example, periodically, by the cable service provider (or MSO) 112 when certain events, movies, terminology, websites become readily known, for example, to the teenage world without requiring parents to be constantly updating the list based on searches and the like. In accordance with an embodiment, the updating can be an enable such that the keywords applied to a client or client devices can be automatically updated, or alternatively, the updating feature can be required to be enabled by the administrator (e.g., parent or guardian) before taking effect for one or more client devices.

In accordance with an exemplary embodiment, the categorized preset keywords can be implemented based on Technical Report 181 (TR-181) of TR-069-enabled devices, which can include End Devices, Residential Gateways, and other Network Infrastructure Devices. For example, in accordance with TR-181, the parameters can include adding the single group of keywords to the value, for example, of parameter 12, and/or adding an enable/disable parameter for each group of keywords.

In accordance with an exemplary embodiment, for example, preset keywords can be implemented via, for example, existing parameters:
Parameter 11 name:
Device.X_Comcast_com_ParentalControl.ManagedSites.BlockedSite.2.Block
Method
    type: string, value: Keyword
Parameter 12 name:
Device.X.Comcast_com_ParentalControl.ManagedSites.BlockedSite.2.Site
    type: string, value: test In accordance with an exemplary embodiment, custom keywords can also be implemented in the same manner as described above.

Figure 5:
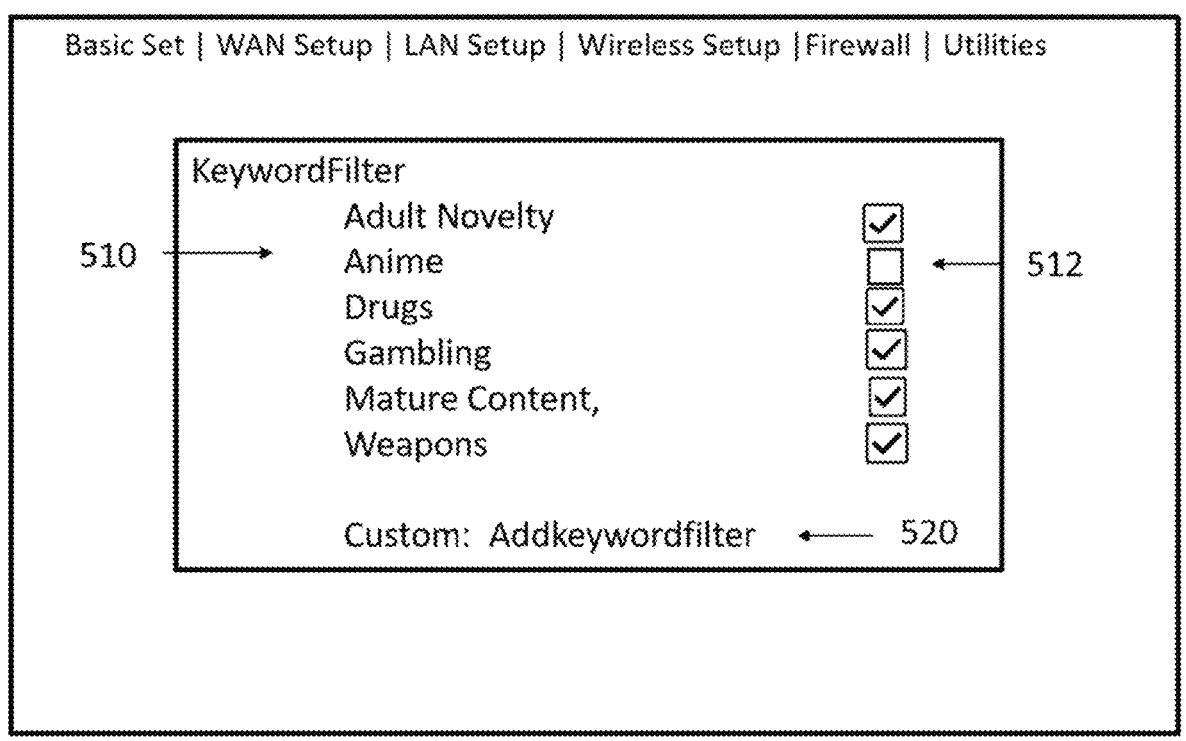
FIG. 5 is an illustration of a graphical user interface (GUI) on a device illustrating a method for setting parental control with preset keywords in accordance with an exemplary embodiment.
Figure 6:
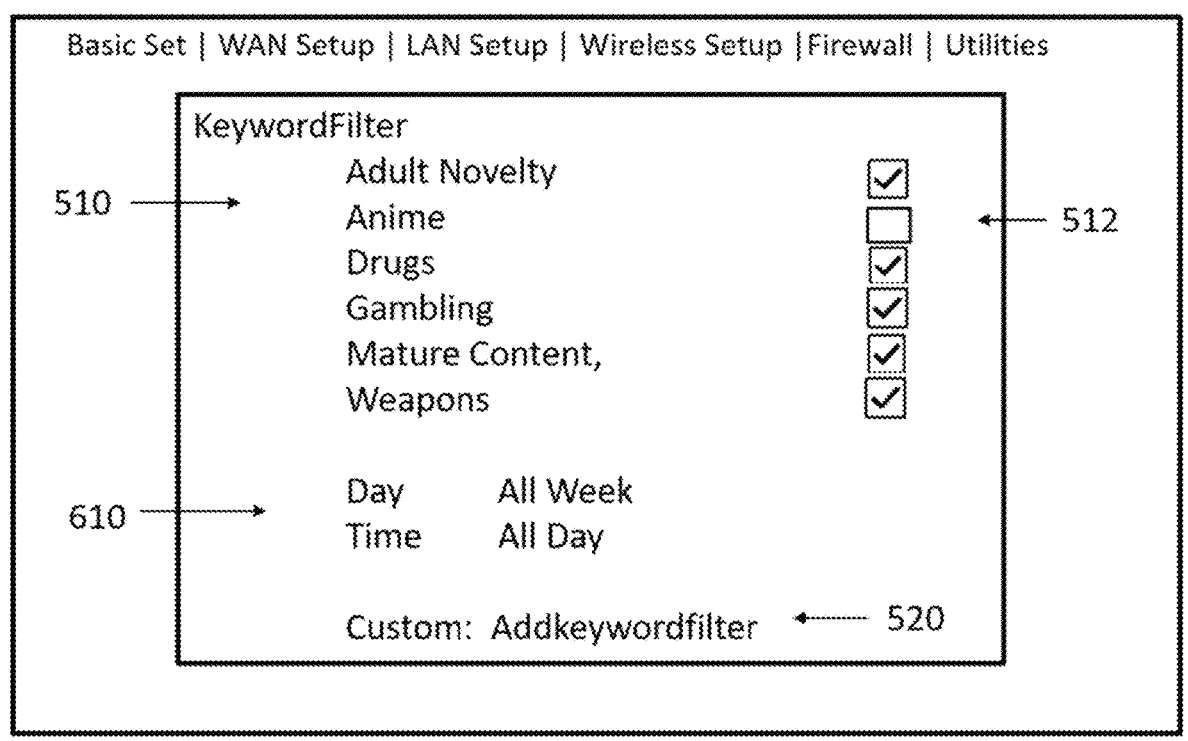
FIG. 6 is another illustration of a graphical user interface (GUI) on a device illustrating a method for setting parental control with preset keywords in accordance with an exemplary embodiment.

In accordance with an exemplary embodiment, the graphical user interface (GUI) 500 as shown in FIGS. 5 and 6, can also be simplified with a list of categories 510 and wherein each of the categories includes a toggle 512. In accordance with an exemplary embodiment, each toggle 512 can switch from enable to disable or alternatively, from disable to enable. The toggle 512, for example, can be a check box as shown, a single click of a button, or a pulldown menu having, for example, two states, enabled and disabled. In accordance with an exemplary embodiment, the blocked time setting for the managed sites on the parental control settings can be removed from the graphical user interface (GUI) 600 and TR181/MIB parameters as shown in FIG. 5. Alternatively, the graphical user interface 600 can include a block time setting 610 (FIG. 6), which can include for example, day and time.

In accordance with an exemplary embodiment, for example, the preset keywords 510 can be a group of keywords based on the most questionable and concerning content types, for example, abortion, adult novelty, anime, death/gore, drugs, dating, gambling, mature content, nudity, pornography, provocative, strip clubs, suicide, tobacco, and/or weapons. For example, as shown in FIG. 5, the preset keywords of adult novelty, drugs, gambling, mature content, and weapons have each be enabled with a checkmark in the toggle 512 such that such content will be blocked. However, anime is not blocked.

In accordance with an alternative embodiment, a custom category 520 can be providing to give an administrator, for example, the ability to add keyword outside of preset keywords, for example, by allowing a keyword and/or keywords (e.g., multiple keywords) with predefined separator to be used.

Figure 7:
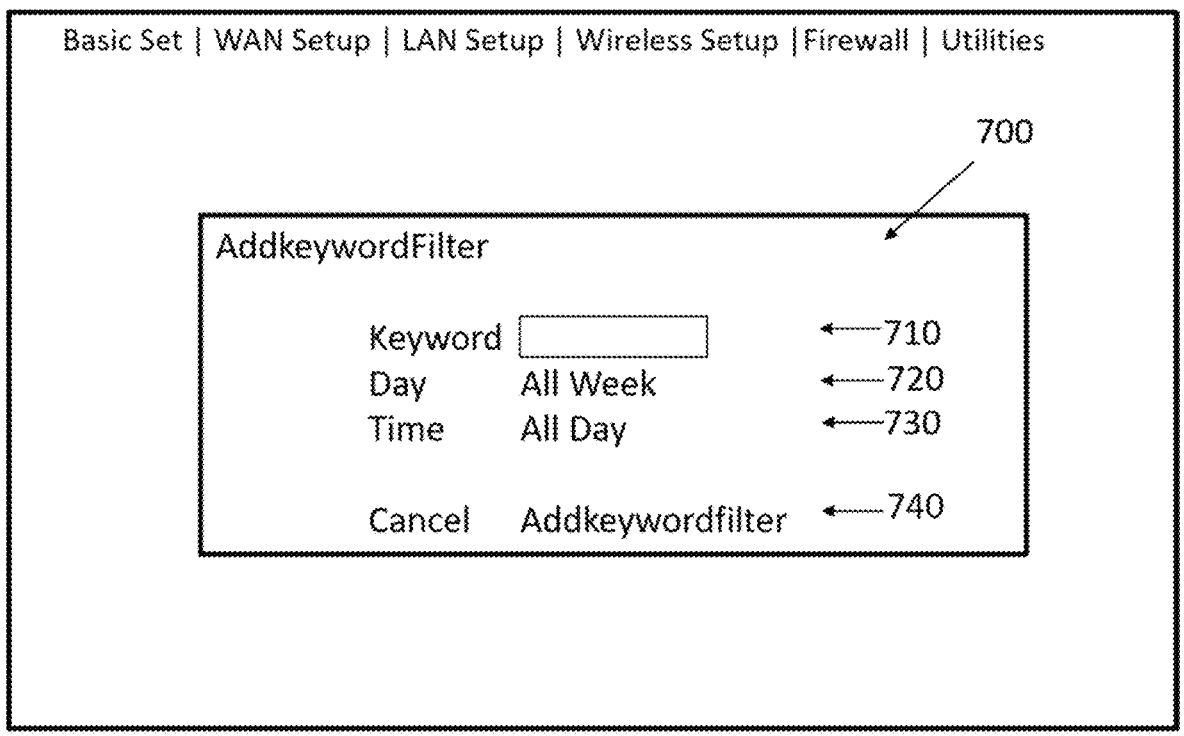
FIG. 7 is another illustration of a graphical user interface (GUI) on a device illustrating a system setup page in accordance with a method for setting parental controls on a broadband device.

As shown in FIGS. 5 and 6, the custom category can be accessed, for example, by clicking on the "Addkeywordfilter" icon 520, which provides the user or administrator with an AddKeywordFilter pop-up window 700 as shown in FIG. 7. On the AddKeywordFilter pop-up window 700, a keyword can be entered into the Keyword field 710, and a Day 720 and Time 730 option can be input via a toggle or input box, for example, an "All Week" option can be selected, and/or the desired time can be selected, for example, "All Day" option 730. In addition, once the custom keywords have been input, the custom keywords can be canceled, for example, by clicking on the "Cancel Addkeywordfilter" icon 740.

Figure 8:
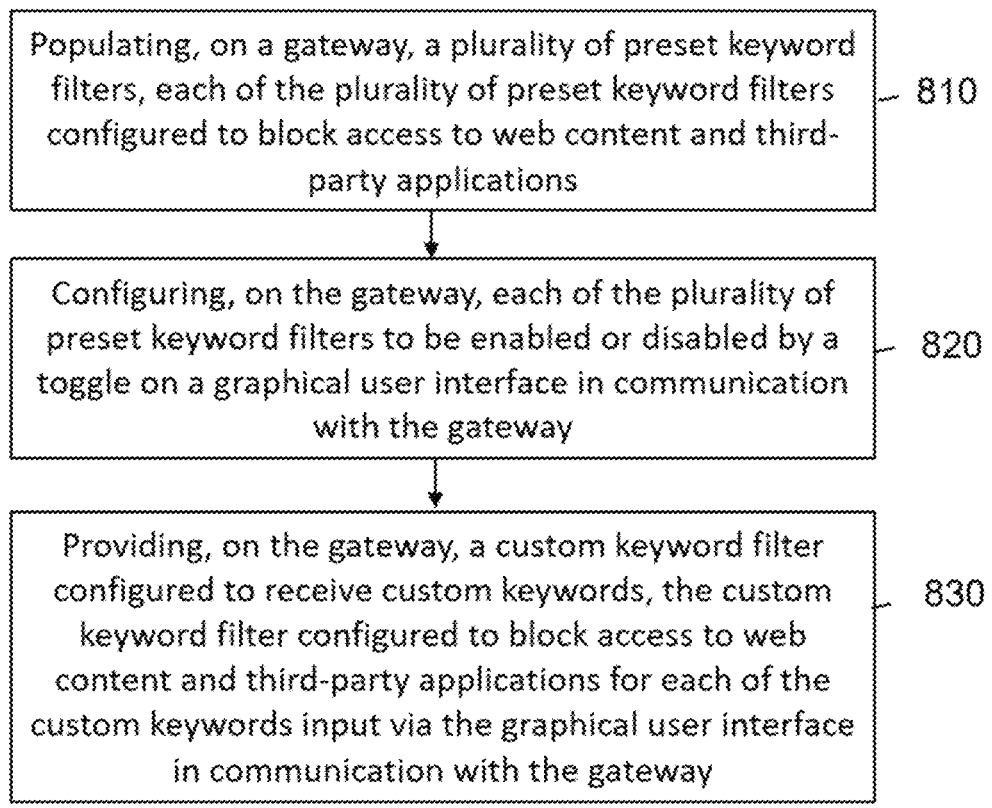
FIG. 8 is a flowchart illustrating a method for controlling access to web content and third-party applications in accordance with an exemplary embodiment.

FIG. 8 is a flowchart 800 illustrating a method for controlling access to web content and third-party applications in accordance with an exemplary embodiment. As shown in FIG. 8, in step 810, a plurality of preset keyword filters are populated on a gateway. Each of the plurality of preset keyword filters configured to block access to web content and third-party applications. In step 820, each of the plurality of preset keyword filters can be configured to be enabled or disabled by a toggle on a graphical user interface in communication with the gateway. In step 830, a custom keyword filter can be provided and configured to receive custom keywords, the custom keyword filter configured to block access to web content and third-party applications for each of the custom keywords input via the graphical user interface in communication with the gateway.

In accordance with an exemplary embodiment, the plurality of preset keyword filters and the custom keyword filter can be set to be always on. In addition, the plurality of preset keyword filters and the custom keyword filter can be set to include a block time setting.

In accordance with an exemplary embodiment, the plurality of preset keyword filters can be periodically updated, for example, automatically, via a software upgrade from the plurality of servers 110 of the cable service provider (or MSO) 112. In addition, the plurality of preset keyword filters can be enforced in accordance with Technical Report 181 for TR-069-enabled devices. In accordance with an embodiment, the toggle may be a check box, a single click of a button, or a pulldown menu having an enabled state and a disabled state.

Dedicated SSID for Parent Control Client Management

Current parental control configuration generally request that a user either enter each or each client devices (for example, computers, gaming consoles, tablets, smartphones) 130a, 130b, 130c, 130d, 130e individually, or by selecting them on a graphical user interface (GUI) and enabling them from the auto-learned list one by one. The process for enabling and/or disabling a client device from a WiFi network is not generally a good process and friendly user experience to first create the list, with the large number of client that a family generally has at home, for example. For example, with smartphones, tablets, computers, gaming consoles, a home may over 30 or even 50 devices, which each must be manually set to "trust" or "untrust". The process for setting these from an auto-learned list can be rather time consuming since each device must be manually set. In addition, it may be difficult to ascertain which devices belong to each of the family members, for example, if more than one family member has an iPad and/or similar smartphone. New devices can also be added every day and/or non-family members may wish to access the WiFi network.

A service set identifier (SSID) is the name assigned to the managed WiFi (wireless) network and provides an IP address for the network. All devices in the network must use this case-sensitive name, typically a text string up to 32 bytes long, to communicate over the WiFi infrastructure. In accordance with an exemplary embodiment, it would be desirable to introduce a new service set identified (SSID) or WiFi network for specified users, for example, for devices or clients of younger children only. In accordance with an embodiment, the new SSID can provide a differentiated SSID and password, which can be managed, for example, by a parent, and given to, for example, younger children to connect their devices or clients to the WiFi network. For example, all of the younger children's clients, for example, smartphone, tablet, iPad, gaming systems, etc. would be connected to this SSID solely. With this new SSID, for example, parental control rules, for example, as disclosed herein, can be applied to the clients connected to the WiFi infrastructure via the new SSID, for example, a dedicated SSID, e.g., SSID-kids. In addition, there is no need to create or maintain a list of clients or devices since parental control rules can be applied to each and every device or client that accesses the WiFi network via the dedicated SSID.

In addition, a dedicated SSID, for example, for younger children or kids only, could avoid the headache that requires, for example, parents to maintain a list of clients or devices for each and every child, and can make the parent control features rather easy to use. For example, the dedicated SSID, for example, SSID-kid, can be on a separate subnet different from, for example, the home subnet, which naturally blocks the chance for children to access local area network (LAN) GUI to change parent control rules or other configurations.

In accordance with an embodiment, for example, a reserved SSID on a broadband device that operates in accordance with Technical Report 181 can be assigned as a dedicated SSID. For example, for a broadband device having a shared internal bridge that supports both 2.4 GHz and 5 GHz can include a plurality of subnets that can be assigned, for example, for use as a home network, security network, hotspot network, guest network, a reserved network, and an Internet of Things (IOT) network. In accordance with an exemplary embodiment, for example, a pair of particular subnets, for example, 10005/10105 for subnet 5 could be used, and/or subnet 7 and/or subnet 8 can be used as a SSID for a particular group of users, for example, younger children and corresponding parental controls can be assigned to the SSID.

For example, for a broadband device, for example, a CPE With 2.4 GHz SSID interface index (ifindex) 5 GHz SSID interface index (iflindex) shared internal bridge subnet purpose can be defined as follows:

10001 10101 brian0 Subnet1 Home network
   10002 10102 brian1 Subnet2 Security network (reserved)
   10003 10103 brian2 Subnet3 Hotspot network
   10004 10104 brian3 Subnet4 Guest Network
   10005 10105 brian4 Subnet5 Kid
   10006 10106 brian5 Subnet6 IOT (reserved)
   10007 10107 brian6 Subnet7 Reserved
   10008 10108 brian7 Subnet 8 Reserved For example, a graphical user interface (GUI) can be accessed via a web browser, such as Internet Explorer, Firefox, or Safari, for example, from a computer device 130b or smartphone 130a, 130e. Once the web browser has been launched, a web address or URL (Uniform Resource Locator), for example, http://192.168.0.1 can be typed into the address box, and a login page can be presented to the administrator as follows:

Gateway>Summary, section Wi-Fi status need to increase the display of SSID-kid
   Gateway>Connection>StatusGateway>Connection>WiFi>Networks
   Connected Devices>Devices
   Parental Control>Managed Sites, Managed Services, remove the "Auto-learned Device" section
   Parental Control>Managed Devices, remove the "Managed Devices" section, replace the "Blocked/Allowed Devices" to the client list under SSID-kid.

SSID-Kid Basic Parameters

Figure 9:
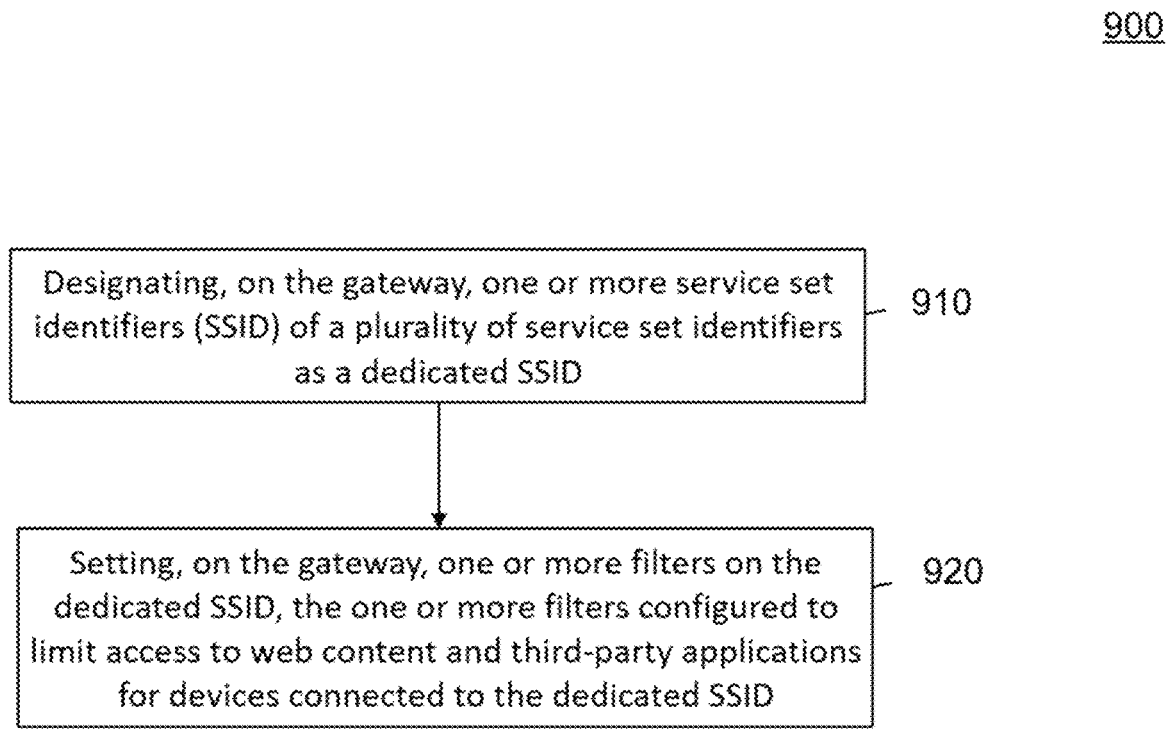
FIG. 9 is a flow chart illustrating a method for introducing parental controls on a gateway with a dedicated set service identifier (SSID) in accordance with an exemplary embodiment.

In accordance with an exemplary embodiment, the parameters for the dedicated SSID, for example, SSID-kid could include:
   General parameters SSID-Kid can use
   LAN Index Subnet 5
   IP Address 192.168.29.1
   Subnet Mask 255.255.255.0
   VLAN ID None
   DHCP Server Enabled
   Start IP Address 192.168.29.2
   End IP Address 192.168.29.254
   Lease Time 3600
   Domain Name Bank
   DNS Override Disabled
   DNS Relay Disabled
   UPnP Enabled Default Wi-Fi Setting for Dedicated SSID, for Example, SSID-Kid In accordance with an exemplary embodiment, the default WiFi settings for a dedicated SSID, for example, SSID-Kid could include:
   SSID Name 2.4 GHz Kid2G-XXXX XXXX Last 4 digits of the CMAC (Cipher-based Message Authentication Code)
   SSID Name 5 GHz Kid5G-XXXX XXXX Last 4 digits of the CMAC
   Encryption Key 2.4 GHz XXXXXXXX XXXX Last 12 digits of the Serial Number
   Encryption Key 5 GHz XXXXXXXXX XXXXLast 12 digits of the Serial Number
   Security Mode 2.4 GHz WPA2-PSK
   Security Mode 5 GHz WPA2-PSK
   BSSID 2.4 GHz Enabled
   BSSID 5 GHz Enabled
   Broadcast Network Name 2.4 GHz Enabled
   Broadcast Network Name 5 GHz Enabled
   AP Isolation Enabled Both Bands
   WMM Enabled Both Bands FIG. 9 is a flow chart illustrating a method for introducing parental controls on a gateway with a dedicated set service identifier (SSID) in accordance with an exemplary embodiment. As shown in FIG. 9, the method includes in step 910, designating, on the gateway, one or more service set identifiers (SSID) of a plurality of service set identifiers as a dedicated SSID. In step 920, the method includes setting, on the gateway, one or more filters on the dedicated SSID, the one or more filters configured to limit access to web content and third-party applications for devices connected to the dedicated SSID.

In accordance with an exemplary embodiment, the one or more filters on the dedicated SSID can be applied to all devices accessing content via the dedicated SSID. For example, the dedicated SSID may be a separate subnet different from a home subnet of the plurality of service set identifiers, and the includes accessing the one or more filters via a local area network (LAN) graphical user interface (GUI) via the home subnet. For example, the graphical user interface or display screen, for example, may be a computer device 130b or smart phone 130a, 130e in communication with the gateway 120.

In accordance with an exemplary embodiment, a plurality of preset keyword filters can be stored on the gateway, each of the plurality of preset keyword filters configured to block access to web content and third-party applications from the dedicated SSID. For example, each of the plurality of keyword filters can be configured to be enabled or disabled by a toggle via a graphical user interface (GUI) in communication with the gateway.

In accordance with an exemplary embodiment, the dedicated SSID may be a reserved SSID on the gateway, and wherein the gateway is configured with two or more frequencies. In addition, a blocking or allowance of devices to the designated SSID may be disabled on the gateway, and wherein the disabling of the blocking or allowance of devices allows devices access to the dedicated SSID in accordance with the one or more filters.

Service-Based with Preset Port Gateway Parental Control

Under current parental controls, the managed services graphical user interface (GUI) page, the blocked service rule relies on ports, which can be confusing for most parental users. For example, blocked service rules rely on Transmission Control Protocol (TCP) and User datagram Protocol (UDP) port numbers used by protocols of an Internet protocol suite for operation of network applications. However, many users do not know the port number/range to bind for specifics service and many users do not know what a port is or TCP/UDP. Accordingly, many users do not use this feature since they don't understand how to use the blocked service rule based on a port. In addition, current parental controls can include one port/port range setting at a time, for one blocked service rule, which can lead to a plurality of entries having to be created to satisfy parent's control needs.

In accordance with an exemplary embodiment, to address the problems of parental control of managed sites and blocked services, for example, limiting access to content (for example, web content and third-party applications) on the Internet, it would be desirable to provide preset commonly used ports, and grouping of the ports based on, for example, service categories, for example, Web Surfing, Gaming (Xbox), Video Streaming, Social Media. For example, Web Surfing can include, for example, ports 80, 443, 8080.

Figure 10:
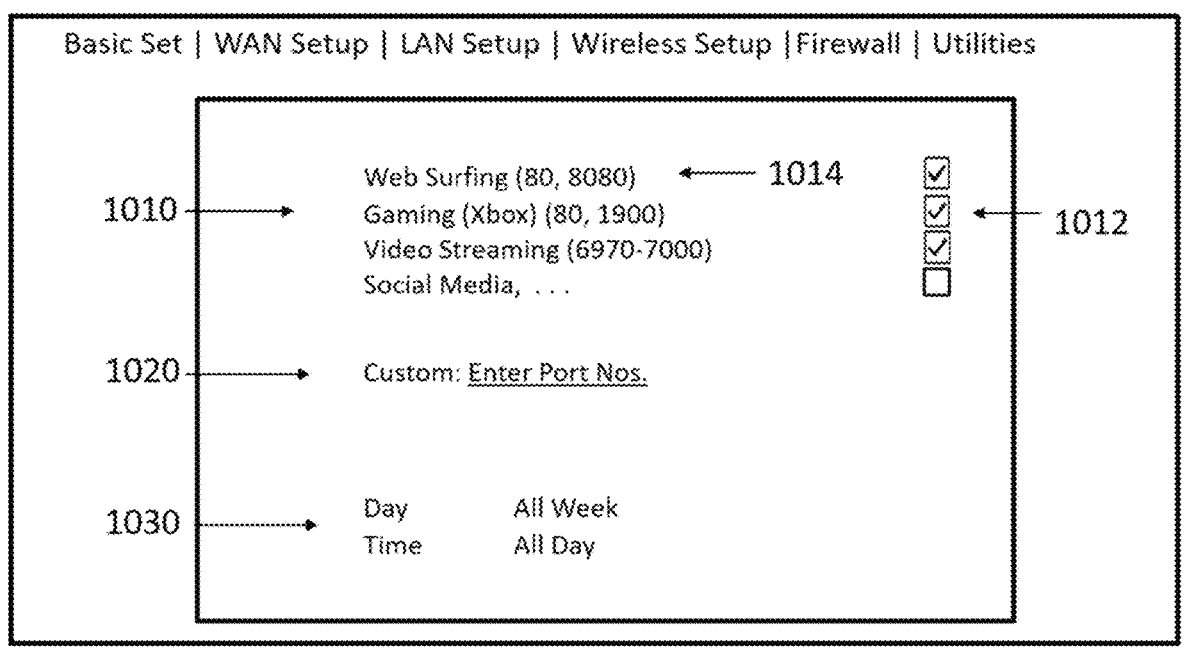
FIG. 10 is an illustration of a graphical user interface (GUI) on a device illustrating a method for setting parental control with preset ports in accordance with an exemplary embodiment.

FIG. 10 is an illustration of a graphical user interface (GUI) 1000 on a device illustrating a method for setting parental control with preset ports in accordance with an exemplary embodiment. In accordance with an exemplary embodiment, the graphical user interface (GUI) or display screen, for example, may be on a computer device 130b or smart phone 130a, 130e in communication with the gateway 120. As shown in FIG. 10, the categories 1010 can be displayed with preset ports in each of the categories, and a toggle 1012 for each category to let an administrator or parent user choose to enable or not. In accordance with an exemplary embodiment, each toggle 1012 can switch from enable to disable or alternatively, from disable to enable. The toggle 1012, for example, can be a check box, a single click of a button, or a pulldown menu having, for example, two states, enabled and disabled. In addition, a custom category 1020 can be given, for example, to allow the parent or administrator to add any keyword outside of preset ones, and wherein one or more ports or port ranges with a predefined separator. In accordance with an exemplary embodiment, a blocked time setting 1030 can be combined with each service category setting 1010, or alternatively, a blocked time setting 1030 can be applied to all of categories 1010.

In accordance with an exemplary embodiment, with the changes proposed for parental control>managed services, the administrator or parent can rather easily use this function by just enabling the toggles 1012, so all the preset ports 1014 will be blocked, if anything more to add, the custom category 1020 can be used.

In accordance with an embodiment, categorized preset ports 1020, implementation can be based on current TR181 parameters as set forth below:
 a. Add the single group of ports to the value of parameter 22 and 23
 b. Add enable/disable parameter for each group
Parameter 20 name:
Device.X_Comcast_com_ParentalControl.Managed Services.Service.1.Description type: string, value: Gaming
Parameter 21 name:
Device.X_Comcast_com_ParentalControl.ManagedServices.Service.1. Protocol type: string, value: TCP
Parameter 22 name:
Comcast_com_ParentalControl.ManagedServices.Service.1.
StartPort type: string, unit, value: 78
Parameter 23 name:
Comcast_com_ParentalControl.ManagedServices.Service.1.
EndPort: type: string, unit, value: 80

Figure 11:
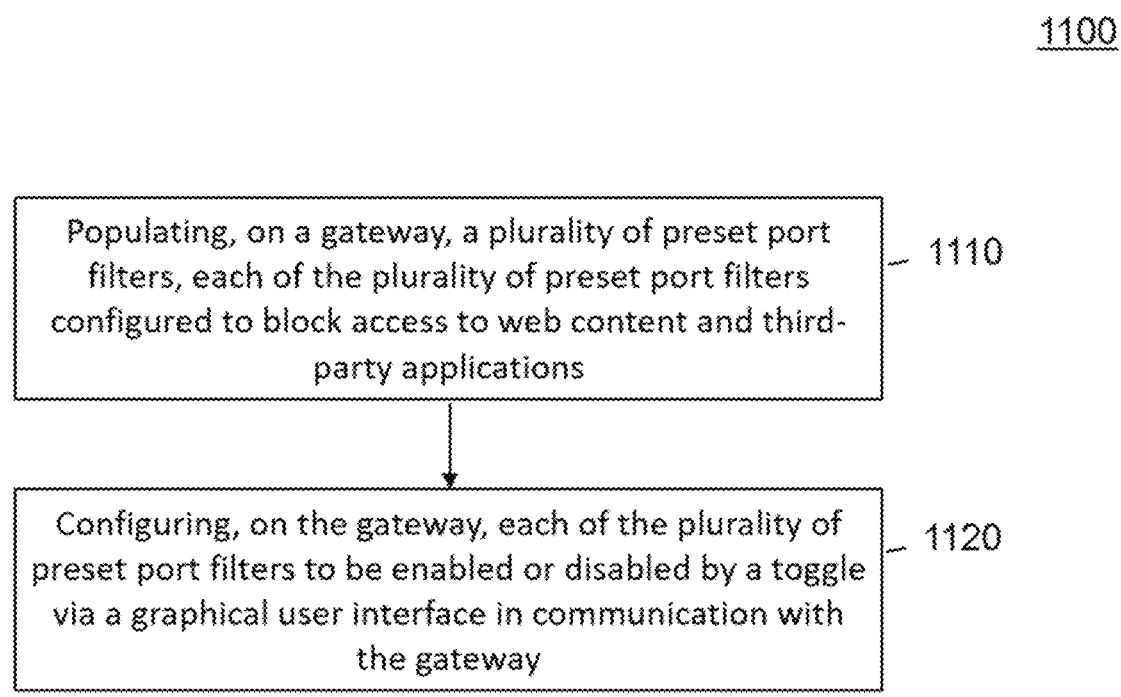
FIG. 11 is a flow chart illustrating a method for controlling access to web content and third-party applications on a gateway in accordance with an exemplary embodiment.

FIG. 11 is a flow chart 1100 illustrating a method for controlling access to web content and third-party applications on a gateway in accordance with an exemplary embodiment. As shown in FIG. 11, in step 1110, a plurality of preset port filters are populated, each of the plurality of preset port filters configured to block access to web content and third-party applications. In step 1120, each of the plurality of preset port filters are configured to be enabled or disabled by a toggle via a graphical user interface in communication with the gateway.

In accordance with an exemplary embodiment, the plurality of preset port filters comprises Transmission Control Protocol (TCP) and User Datagram Protocol (UDP) port numbers used by protocols of an Internet protocol suite for operation of network applications. In addition, the method includes grouping two or more TCP and UDP ports in one or more of the plurality of preset port filters. In accordance with an exemplary embodiment, each of the plurality of preset port filters are identified by a service category. In addition, on the gateway, a custom port filter configured to receive custom port numbers can be provided, the custom port filter configured to block access to web content and third-party applications for each of the custom port number input via a graphical user interface in communication with the gateway. In accordance with an embodiment, the plurality of preset port filters can include a block time setting.

In accordance with an exemplary embodiment, the plurality of preset port filters can be enforced in accordance with Technical Report 181 for TR-069-enabled devices. In addition, the toggle is a check box, a single click of a button, or a pulldown menu having an enabled state and a disabled state.

Techniques consistent with the present disclosure provide, among other features, systems and methods for parental control of broadband devices. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for controlling access to web content and third-party applications, the method comprising:
 populating, on a gateway, a plurality of preset keyword filters, each of the plurality of preset keyword filters configured to block access to web content and third-party applications;
 periodically updating, on the gateway, the plurality of preset keyword filters, wherein the periodically updating the plurality of preset keyword filters is responsive to a certain event, movie, terminology, and/or website;

configuring, on the gateway, each of the plurality of preset keyword filters to be enabled or disabled by a toggle on a graphical user interface in communication with the gateway; and providing, on the gateway, a custom keyword filter configured to receive custom keywords, the custom keyword filter configured to block access to web content and third-party applications for each of the custom keywords input via the graphical user interface in communication with the gateway.

2. The method according to claim 1, further comprising: setting, on the gateway, the plurality of preset keyword filters and the custom keyword filter to be always on.

3. The method according to claim 1, further comprising: setting, on the gateway, the plurality of preset keyword filters and the custom keyword filter to include a block time setting, the block time setting defining a time period during which the plurality of preset keyword filters and the custom keyword filter are active.

4. The method according to claim 1, wherein the toggle is a check box, a single click of a button, or a pulldown menu having an enabled state and a disabled state.

5. The method according to claim 1, wherein each of the plurality of preset keyword filters includes a plurality of keywords in a defined category.

6. A method for introducing controls on a gateway, the method comprising:
designating, on the gateway, one or more service set identifiers (SSID) of a plurality of service set identifiers as a dedicated SSID; and
setting, on the gateway, one or more preset keyword filters on the dedicated SSID, the one or more preset keyword filters configured to limit access to web content and third-party applications for devices connected to the dedicated SSID;
periodically updating, on the gateway, the plurality of preset keyword filters, wherein the periodically updating the plurality of preset keyword filters is responsive to a certain event, movie, terminology, and/or website;
configuring, on the gateway, each of the plurality of preset keyword filters to be enabled or disabled by a toggle on a graphical user interface in communication with the gateway; and
providing, on the gateway, a custom keyword filter configured to receive custom keywords, the custom keyword filter configured to block access to web content and third-party applications for each of the custom keywords input via the graphical user interface in communication with the gateway.

7. The method according to claim 6, further comprising: applying the one or more filters on the dedicated SSID to all devices accessing content via the dedicated SSID.

8. The method according to claim 6, wherein the dedicated SSID is a separate subnet different from a home subnet of the plurality of service set identifiers, the method comprising:
accessing the one or more filters via a local area network (LAN) graphical user interface (GUI) via the home subnet.

9. The method according to claim 6, comprising:
storing, on the gateway, the one or more preset keyword filters.

10. The method according to claim 6, wherein the dedicated SSID is a reserved SSID on the gateway, the gateway configured with two or more frequencies.

11. The method according to claim 6, further comprising: disabling, on the gateway, a blocking or allowance of devices to the
designated SSID, and wherein the disabling of the blocking or allowance of devices allows devices access to the dedicated SSID in accordance with the one or more filters.

12. A method for controlling access to web content and third-party applications, the method comprising:
populating, on a gateway, a plurality of preset port filters, each of the plurality of preset port filters configured to block access to web content and third-party applications;
periodically updating, on the gateway, the plurality of preset port filters, wherein the periodically updating the plurality of preset port filters is responsive to a certain event, movie, terminology, and/or website;
configuring, on the gateway, each of the plurality of preset port filters to be enabled or disabled by a toggle via a graphical user interface in communication with the gateway; and
providing, on the gateway, a custom port filter configured to receive custom port numbers, the custom port filter configured to block access to web content and third-party applications for each of the custom port number input via a graphical user interface in communication with the gateway.

13. The method according to claim 12, wherein the plurality of preset port filters comprises Transmission Control Protocol (TCP) and User Datagram Protocol
(UDP) port numbers used by protocols of an Internet protocol suite for operation of network applications, the method further comprising:
grouping two or more TCP and UDP ports in one or more of the plurality of preset port filters.

14. The method according to claim 12, further comprising:
identifying each of the plurality of preset port filters by a service category.

15. The method according to claim 12, further comprising:
setting, on the gateway, the plurality of preset port filters to include a block time setting, the block time setting defining a time period during which the plurality of preset port filters and the custom keyword filter are active.

16. The method according to claim 12, wherein the toggle is a check box, a single click of a button, or a pulldown menu having an enabled state and a disabled state.

17. A method for controlling access to web content and third-party applications, the method comprising:
populating, on a gateway, a plurality of preset keyword filters, each of the plurality of preset keyword filters configured to block access to web content and third-party applications, wherein each of the plurality of preset keyword filters includes a plurality of keywords in a defined category, and wherein the defined category is one of: abortion, adult novelty, anime, death/gore, drugs, dating, gambling, mature content, nudity, pornography, provocative, strip clubs, suicide, tobacco, and weapons;
configuring, on the gateway, each of the plurality of preset keyword filters to be enabled or disabled by a toggle on a graphical user interface in communication with the gateway; and
providing, on the gateway, a custom keyword filter configured to receive custom keywords, the custom keyword filter configured to block access to web content and third-party applications for each of the custom keywords input via the graphical user interface in communication with the gateway.

18. The method according to claim 17, further comprising:
periodically updating, on the gateway, the plurality of preset keyword filters, wherein the periodically updating the plurality of preset keyword filters is responsive to a certain event, movie, terminology, and/or website.

* * * * *